UNITED STATES PATENT OFFICE.

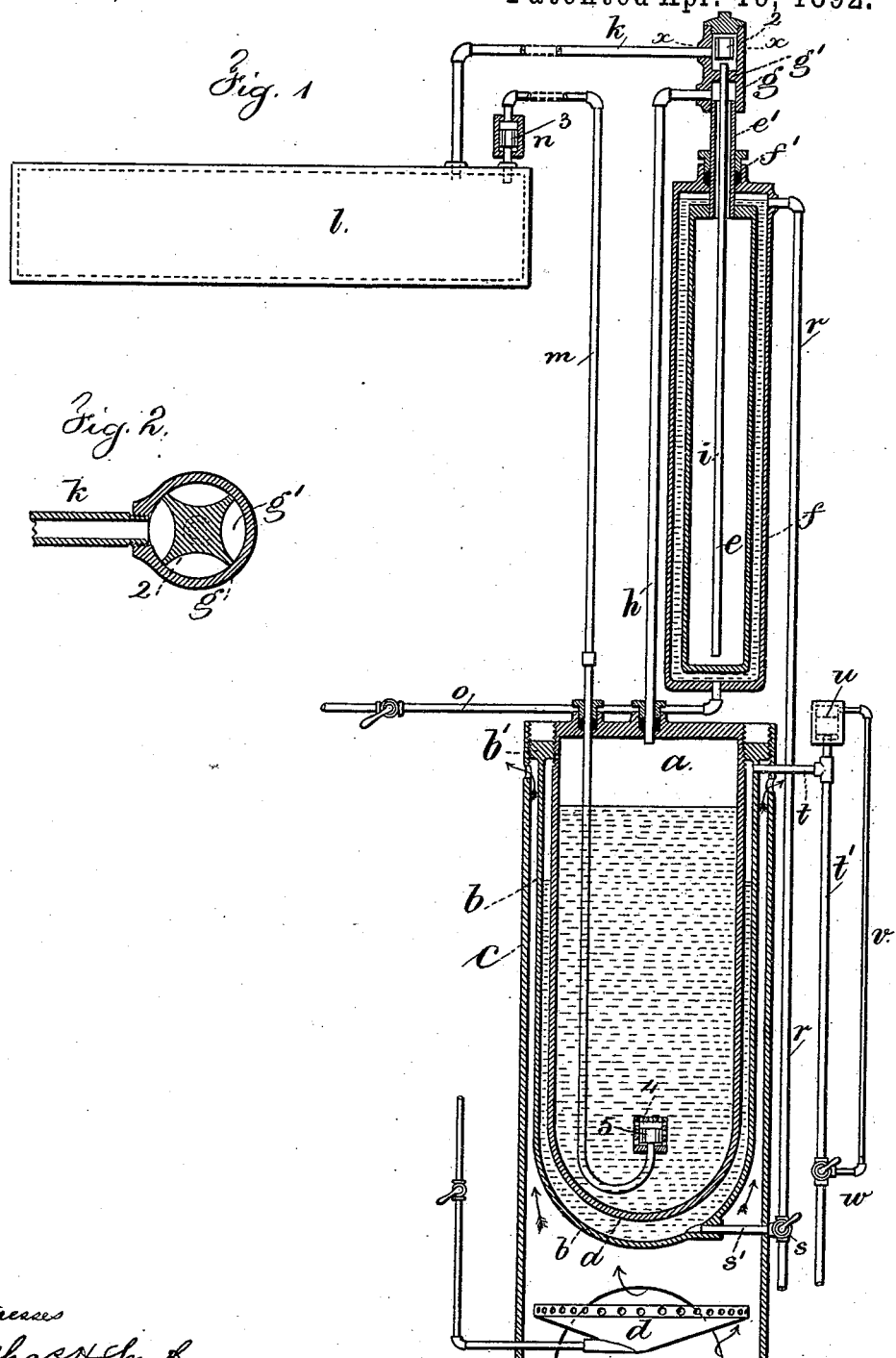

DANIEL L. HOLDEN, OF NEW YORK, N. Y.

REFRIGERATING-MACHINE.

SPECIFICATION forming part of Letters Patent No. 473,156, dated April 19, 1892.

Application filed April 22, 1891. Serial No. 389,918. (No model.)

*To all whom it may concern:*

Be it known that I, DANIEL L. HOLDEN, a citizen of the United States, residing at the city, county, and State of New York, have invented an Improvement in Refrigerating-Machines, of which the following is a specification.

My present improvements in refrigerating-machines relate especially to machines for individual or household use, or for analogous use in hotels where it is desired to cool receptacles for articles of food, the same being designed to replace ice in refrigerators, &c. I employ a cylindrical vessel or still, in which ammonia is distilled, preferably by heat applied to water in a jacket. From this receptacle the anhydrous ammonia under pressure is conveyed to a vessel in which it is condensed, and from which it escapes or passes to and is allowed to expand into a cylinder or chamber where cold is produced. In this refrigerating-chamber intense cold is produced by the expansion and vaporization of the ammonia, and the gas or vapor is returned to the still and reabsorbed, while the still is cooled by a circulation of water through the jacket. Pipes are employed for conveying and returning the ammonia and for conveying the cooling-liquid to the jackets of the still and condenser, and the valves made use of are automatic and within closed chambers, so as to prevent any external leakage.

In the drawings, Figure 1 is a vertical section and partial elevation of my apparatus, and Fig. 2 is a sectional plan at $x$ $x$ in larger size.

$a$ represents the cylindrical vessel or still for holding the solution or compound from which the anhydrous ammonia is to be distilled. This is surrounded by a jacket $b$, the two being supported by a cylindrical case $c$, which is partially open at the bottom and perforated at the top for the ingress of air and the egress of the products of combustion, and heat is supplied to the jacket $b$ by a Bunsen or other burner $d$. These parts are preferably connected by a ring flange $b'$ at the upper end of the jacket $b$, which screws into the case $c$, and into which ring the cylindrical vessel $a$ screws and by which it is supported.

$e$ represents a condenser, and $f$ a jacket to the same. A pipe $e'$ passes from the upper end of the condenser $e$ through the jacket $f$ and its packing $f'$, and upon the outer end of said pipe $e'$ is a cylindrical coupling $g$. The pipe $h$ is connected at its lower end to the vessel or still $a$ and at its upper end to the lower chamber of the cylindrical coupling $g$. The coupling $g$ is made with a central partition $g'$, and to this is connected a pipe $i$, which passes down through the pipe $e'$ into the condenser $e$ and to near the bottom of the same, and this pipe $i$ opens at its upper end into the upper chamber of the coupling $g$, in which is a movable valve 2, which is automatic and closes by its own weight. The upper end of the coupling $g$ is closed, and a pipe $k$ connects with the upper chamber of the coupling at one end and at the other end with the cooling-chamber $l$, which cooling-chamber may be located at a distance from the other portions of the apparatus and, if desired, within a refrigerator or other similar device for holding articles to be cooled, this cooling-chamber being especially designed to occupy the usual place of the ice-chamber and replace a block of ice. A pipe $m$ passes from the cooling or refrigerating chamber $l$ to and into the cylindrical vessel or still $a$, and in this pipe is a coupling $n$, in which is a valve 3, similarly constructed to the valve 2. The pipe $m$ terminates at its lower end within the vessel $a$ with a return bend and a cage 4, in which is a valve 5. A pipe $o$ supplies water to the base of the jacket $f$, and a pipe $r$ extends from the top of the jacket $f$ down to and beyond the three-way cock $s$, and a short pipe $s'$ connects the base of the jacket $b$ to the three-way cock $s$. A pipe $t$ passes from the top of the jacket $b$ to a T-coupling upon the pipe $t'$. Upon the upper end of the pipe $t'$ is a coupling and valve $u$, and a small pipe $v$ connects the top of this coupling $u$ with the three-way cock $w$, situated in the pipe $t'$.

The operation of the apparatus is as follows: The ammonia compound being in the vessel or still $a$ and water in the jacket $b$ and the three-way cocks $s$ being closed to $s'$, heat is applied from the burner $d$ and the anhydrous ammonia is distilled from the liquid in the vessel $a$, the gas passing under pressure by the pipe $h$ into the lower chamber of the coupling $g$ down the pipe $e'$ into the condenser $e$, and cooling-water is allowed to flow through the pipe $o$ into the jacket $f$ and away by the pipe $r$ past the three-way cock $s$ to a sewer or vessel. In the receptacle $e$ the anhydrous ammonia-gas is condensed and liquefied by the cooling-water and passes still under pressure by the pipe $i$ into the upper receptacle of $g$, lifts the valve 2, and escapes by the pipe $k$ into the cooling-chamber $l$. During the process of distillation if the pressure of steam in the jacket $b$ rises too high a way of escape is provided through the pipe $t$, coupling and valve $u$, pipe $v$, and three-way cock $w$, which will relieve surplus. This process of distillation is maintained for about an hour, or until the ammonia is mostly distilled from the liquid in the still $a$ and has passed to the condenser and chamber $l$. At this time the flame in the burner $d$ is to be extinguished and the distillation stopped and the temperature of the vessel or still $a$ is to be reduced, as hereinafter set forth. As the temperature and pressure lessen in the vessel $a$ the ammonia in $l$ vaporizes and because its pressure passes the valve 3 and by the pipe $m$ into the vessel $a$ and is reabsorbed. This vaporization produces an intense cold in the chamber $l$. By turning the three-way cocks $s$ and and $w$ the cooling-liquid will pass by the pipe $o$ into the jacket $f$ and pipes $r$ and $s'$ into the jacket $b$ and be discharged by the pipes $t$ $t'$ into a sewer or vessel. This will quickly cool down the liquid in the vessel $a$ to such an extent that the pressure in the apparatus will be reduced and fluid anhydrous ammonia in the chamber $l$ will vaporize and pass through the coupling $n$ by the pipe $m$ and by the valve 5 into the vessel $a$, where it will be reabsorbed, after which the process of distillation may be repeated. This provides a quick means of reabsorbing the gaseous ammonia. The same may, however, be very gradually accomplished by allowing the liquid in the vessel $a$ to cool down gradually and reduce the pressure, so that the ammonia in the chamber $l$ will come over slowly into the vessel $a$ and be absorbed, thus prolonging the cooling action resulting from the vaporizing of the fluid ammonia in the chamber $l$.

In consequence of the valves 2 and 3 being within tightly-closed chambers and closing automatically by their own weight but little attention is required in using the apparatus and risk of external leakage is reduced to a minimum. The valve 3 opens toward the still and the valve 2 toward the refrigerating-chamber.

I claim as my invention—

The combination, in a refrigerating apparatus, of a still and heater for the same, a cylindrical condensing-vessel having a tube $e'$ and coupling $g$, with two chambers at the upper end thereof and a pipe from the lower chamber leading to the still, the tube $i$, passing from near the bottom of the condenser through the tube $e'$ and into the upper chamber of the coupling $g$, a valve 2 in said chamber and at the upper end of the pipe $i$, and a refrigerating-chamber $l$ and pipe $k$ therefrom to the upper chamber of the coupling, substantially as specified.

Signed by me this 15th day of April, A. D. 1891.

DANIEL L. HOLDEN.

Witnesses:
 HAROLD SERRELL,
 GEO. T. PINCKNEY.